(12) United States Patent
El Fouzari et al.

(10) Patent No.: US 11,752,706 B2
(45) Date of Patent: Sep. 12, 2023

(54) METHOD FOR PREPARING A TEXTILE/RESIN COMPOSITE PART

(71) Applicant: IVY GROUP Holding, Reims (FR)

(72) Inventors: Mustapha El Fouzari, Reims (FR); Nicolas Amouroux, Reims (FR)

(73) Assignee: IVY GROUP HOLDING, Reims (FR)

( * ) Notice: Subject to any disclaimer, the term of this patent is extended or adjusted under 35 U.S.C. 154(b) by 245 days.

(21) Appl. No.: 16/613,014

(22) PCT Filed: May 17, 2018

(86) PCT No.: PCT/EP2018/062896
§ 371 (c)(1),
(2) Date: Apr. 13, 2020

(87) PCT Pub. No.: WO2018/211009
PCT Pub. Date: Nov. 22, 2018

(65) Prior Publication Data
US 2020/0247018 A1    Aug. 6, 2020

(30) Foreign Application Priority Data

May 17, 2017 (FR) .................................. 1754328
Nov. 24, 2017 (FR) .................................. 1761162

(51) Int. Cl.
| B29C 37/00 | (2006.01) |
| B29C 70/30 | (2006.01) |
| B29K 33/00 | (2006.01) |
| B29K 667/00 | (2006.01) |
| B29K 677/00 | (2006.01) |

(52) U.S. Cl.
CPC .......... B29C 70/30 (2013.01); B29C 37/0028 (2013.01); B29C 37/0032 (2013.01); *B29K 2033/12* (2013.01); *B29K 2667/00* (2013.01); *B29K 2677/00* (2013.01); *B29K 2713/00* (2013.01)

(58) Field of Classification Search
CPC ............ B29C 37/0025; B29C 37/0028; B29C 37/0032; B29C 2037/0035; B29C 2037/0039; B29C 2037/0042; B29C 2037/0046
See application file for complete search history.

(56) References Cited

U.S. PATENT DOCUMENTS

| 9,738,019 | B2 | 8/2017 | Park | |
| 2004/0034170 | A1* | 2/2004 | Brant | C08L 23/10 525/240 |
| 2009/0098349 | A1* | 4/2009 | Ichikawa | B32B 27/08 428/203 |
| 2009/0224431 | A1* | 9/2009 | Larsen | B29C 37/0032 264/328.14 |
| 2010/0156007 | A1* | 6/2010 | Huang | B41M 5/24 264/478 |
| 2011/0049097 | A1 | 3/2011 | Wuister et al. | |
| 2012/0156445 | A1 | 6/2012 | Schmidt et al. | |
| 2012/0199277 | A1* | 8/2012 | Loveder | B29D 35/122 156/60 |
| 2014/0113075 | A1 | 4/2014 | Maillot et al. | |
| 2015/0024187 | A1* | 1/2015 | Kutluoglu | B32B 37/04 428/220 |
| 2016/0052227 | A1* | 2/2016 | Takihara | B32B 27/06 428/141 |
| 2017/0107377 | A1* | 4/2017 | Belden | C09D 5/00 |
| 2017/0157804 | A1* | 6/2017 | Takemoto | B29C 37/0028 |
| 2017/0217123 | A1* | 8/2017 | Kataoka | B44C 3/02 |
| 2018/0327617 | A1* | 11/2018 | Inoue | C09D 11/037 |
| 2019/0232534 | A1* | 8/2019 | Shade | B29C 37/0028 |

FOREIGN PATENT DOCUMENTS

| CA | 2755330 | 12/2011 | |
| CN | 103619603 | 3/2014 | |
| CN | 104039534 A | 9/2014 | |
| CN | 106042239 A | 10/2016 | |
| DE | 102014203543 | 8/2015 | |
| EP | 0755769 | 1/1997 | |
| EP | 2796275 | 10/2014 | |
| EP | 3098047 | 11/2016 | |
| GB | 2322597 | 9/1998 | |
| JP | 04108152 | 4/1992 | |
| JP | 09039010 | 2/1997 | |
| JP | 11235753 | 8/1999 | |
| JP | 11235753 A * | 8/1999 | ......... B29C 37/0032 |
| JP | 2001060747 | 3/2001 | |
| JP | 2005231044 | 9/2005 | |
| JP | 2011143559 | 7/2011 | |
| JP | 5362596 | 12/2013 | |
| JP | 2014512261 | 5/2014 | |

OTHER PUBLICATIONS

Chen, Handbook of plastics industry—Thermosetting Plastic Processing Technology and Equipment, Chemical Industry Press. Jan. 2001, p. 57.
Satas, Plastic Finishing and Decoration, China Petrochemical Press. Mar. 1992, pp. 431-436.
International Search Report issued in connection with International Patent Application No. PCT/EP2018/062896, dated Dec. 12, 2018.
Qian Jun Hao, "Ink Formulation and Printing Manuals(Chinese Edition)" Published by China Light Industry Press, Pub. Date :Apr. 2004, 2000, ISBN 10: 7501942285, 8 pgs.

* cited by examiner

*Primary Examiner* — Alison L Hindenlang
*Assistant Examiner* — Alexander A Wang
(74) *Attorney, Agent, or Firm* — DUANE MORRIS LLP

(57) ABSTRACT

The present invention relates to a method for manufacturing a textile/thermoplastic resin composite part, comprising the following steps: (a) providing a mould; (b) applying at least one composition (A) comprising at least one thermoplastic resin; (c) heating the mould; (d) applying the textile to the heated thermoplastic resin; (e) cooling the mould; (f) unmoulding.

21 Claims, No Drawings

METHOD FOR PREPARING A TEXTILE/RESIN COMPOSITE PART

This application is a U.S. national stage application under 35 U.S.C. § 371 of International Application No. PCT/EP2018/062896, filed May 17, 2018 which claims priority to French patent application no. 1754328, filed May 17, 2017; and French patent application no. 1761162, filed Nov. 24, 2017, the entireties of which are incorporated herein by reference.

The present invention relates to a method for preparing a textile/thermoplastic resin composite part (also called a coated fabric) and more particularly to such composite parts having reliefs, in particular positive and negative reliefs (embossing/debossing).

In general, coated fabrics are obtained by a method comprising:

The coating on paper of a thermoplastic resin;
The baking of the product obtained;
The deposition by coating with a glue composition (especially vinyl base, polyurethane, etc.);
The deposition of a textile support on the glue;
The baking of the product obtained;
The recovery of a smooth coated textile.

To give a surface texture to the resulting textile, it is generally known to modify the coated textile after its manufacture. In particular, the coated textile may be varnished (using a vinyl, acrylic, polyurethane, etc.) using a cylinder (on the basis of the principle of gravure printing), and the composite so obtained is grained or embossed using a pressing plate or engraving cylinder. This gives the coated fabric an imitation leather look, to reveal a logo, a pattern, a monogram. However, this method does not make it possible to obtain, with high definition, patterns that are positively and negatively etched on the same fabric. It also does not make it possible to obtain a sufficient depth of etching and thus limits the geometry of the patterns. This method also does not make it possible to obtain a composite textile with an impression placed on the etched patterns.

There is therefore an interest in providing a method for obtaining textile/thermoplastic or thermosetting resin composite parts having positive and negative patterns, and optionally having an impression placed on the etched patterns.

An object of the present application is to provide a method for obtaining textile/thermoplastic resin composite parts having positive and negative patterns.

Another objective of the present application is to provide such a method for obtaining a large depth of etching.

Yet another object of the present invention is to provide such a method allowing a great variability of geometry of the patterns.

A further object of the present invention is also to provide such a method for placing an impression (coloring) on the etched pattern(s).

Other objectives will become apparent upon reading the description of the invention which follows.

These objectives are fulfilled by the present application which relates to a method for manufacturing a textile composite/thermoplastic resin part comprising the following steps:

a) Provide a mold;
b) Apply at least one composition (A), comprising at least one thermoplastic resin, at the bottom of the mold;
c) Heat the mold obtained in the previous step;
d) Apply the textile to the heated thermoplastic resin;
e) Cool the mold;
f) Remove mold.

Depending on the nature of the composition (A) it may be necessary to heat the mold before application of the composition (A).

Step c) corresponds to a post-gelation allowing application of the textile. The heating temperature may be determined by those skilled in the art and depends on the composition deposited before deposition of the textile. After deposition of the composition (A), heating to gelation of the composition (A), i.e. heating to reach a mold temperature of between 70 and 300° C., preferably between 100 and 260° C., is achieved before deposition of the textile The method of the invention may further comprise a step a0), before step b), for deposition of a varnish composition (A0) at the bottom of the mold, on all or part of the mold.

Thus, the method of the invention may comprise the following steps:

a) Provide a mold;
a0) Apply on all or part of the mold a varnish composition (A0) at the bottom of the mold;
b) Apply at least one composition (A) comprising at least one thermoplastic resin;
c) Heat the mold;
d) Apply the textile to the heated thermoplastic resin;
e) Cool the mold;
f) Remove mold.

Depending on the nature of the composition (A), it may be necessary to heat the mold before application of the composition (A).

The method of the invention may further comprise, especially when it comprises step a0), a step a1), before step b), during step b), after step b), or, where appropriate, after step a0), of deposition on all or part of the surface of the mold a colored composition (B) comprising at least one thermoplastic or thermosetting resin. In the context of the present invention, the expression "during step b)" is understood to mean the case where when step b) involves the application of several compositions (A), wherein the composition (B) is applied between at least two compositions (A). Thus, when step b) involves the application of several compositions (A), the composition (B) may be applied before any compositions (A) or after any compositions (A) or even between at least two compositions (A).

Thus, the method of the invention may comprise the following steps:

a) Provide a mold;
a0) Optionally, apply on all or part of the mold a varnish composition (A0) at the bottom of the mold;
a1) Heat the mold, for example to a temperature between 20 and 100° C., preferably 50 to 100° C., and apply a composition (B) on all or part of the mold;
b) Apply at least one composition (A) comprising at least one thermoplastic resin;
c) Heat the mold;
d) Apply the textile to the heated thermoplastic resin;
e) Cool the mold;
f) Remove mold.

Depending on the nature of the composition (A), it may be necessary to heat the mold before application of the composition (A).

Alternatively, the method of the invention may comprise the following steps:

a) Provide a mold;
a0) Optionally, apply a varnish composition (A0) on all or part of the mold at the bottom of the mold;
b) Apply at least one composition (A) comprising at least one thermoplastic resin;

a1) Apply a composition (B) to all or part of the mold obtained;
c) Heat the mold;
d) Apply the textile to the heated thermoplastic resin;
e) Cool the mold;
f) Remove mold.

Step c) which takes place after the deposition of the composition (B) corresponds to a post-gelation step allowing application of the textile. The heating temperature may be determined by those skilled in the art and depends on the composition deposited before the deposition of the textile. After deposition of the composition (B), heating up to gelation of the composition (B), or heating up to a mold temperature between 70 and 300° C., preferably between 100 and 260° C., is performed.

In these embodiments:
in the case where step a0) is omitted, the mold is heated in step a) before depositing the composition (B);
in the case where step a0) is carried out, the mold is heated at the end of step a0) before depositing the composition (B).

Depending on the nature of the composition (A), it may be necessary to heat the mold before application of the composition (A), for example to a temperature of 20 to 360° C.

Depending on the nature of the composition (A), it may be necessary to heat the mold before application of the composition (B), for example to a temperature of 20 to 100° C., preferably 50 to 100° C.

Composition (A0):

Preferably, the varnish composition (A0) comprises, by weight relative to the weight of the composition:
5 to 20%, preferably 10 to 15%, of at least one thermoplastic or thermosetting resin whose particles have a size between 0.1 and 10 µm, preferably between 0.1 and 5 µm;
5 to 20%, preferably 10 to 15%, of at least one plasticizer, and
65 to 90%, preferably 70 to 90%, of at least one organic solvent or water.

The composition (A0) may be deposited on all or part of the mold.

Particularly advantageously, this composition (A0) may be projected through printing nozzles of small diameter, for example with a diameter of 40 µm, or even with a diameter of 30 µm or 20 µm. This composition (A0) may also be deposited by spraying, in particular using a spray gun.

The resin may be a thermosetting or "thermosettable" resin, and in particular among the thermosettable resins, those comprising epoxy, isocyanate or acidic units, which lead to obtaining epoxy, polyurethane or polyester type thermoset networks, are preferred. Preferably, the resin is a thermoplastic resin. In this case, the ratio by weight of the thermoplastic resin to the plasticizer is between 1:0.1 and 1:2, and preferably between 1:0.5 and 1:1. This ratio makes it possible to obtain a resin that is particularly resistant to abrasion. The thermoplastic resins may be chosen from polyvinyl chloride, chlorinated polyvinyl chloride (CPVC), copolymers of vinyl chloride, for example copolymers of vinyl chloride and of vinyl acetate, and polyvinylidene fluoride. polyamides such as polyamide 11 and polyamide 12, high density polyethylene and polymethyl methacrylate. Advantageously, polyvinyl chloride and polymethyl methacrylate and copolymers of vinyl chloride and vinyl acetate should be chosen. Preferably, the thermoplastic resin is a polyvinyl chloride (PVC) resin obtainable by an emulsion, suspension or microsuspension process. By way of example, mention may be made of the resin sold under the name Pevikon® P1510 by the company INEOS. The resin of the composition (A0) may also be a mono-component or two-component polyurethane resin, UV-based varnishes or a latex.

The varnish composition (A0) is, in particular, a vinyl and acrylic copolymer composition, a vinyl polymer, an acrylic polymer or a mono-component or two-component polyurethane.

Preferably, the composition (A0) is an acrylic polymer composition.

The plasticizer used in the composition which is the subject of the invention is a plasticizer compatible with the resin. The plasticizer may be chosen from esters formed from alcohol and an organic acid such as trimellitic acid, sebacic acid, adipic acid, phthalic acid, citric acid, benzoic acid, tallic acid, glutaric acid, fumaric acid, maleic acid, oleic acid, palmitic acid, and acetic acid. In particular, the plasticizer may be chosen from octyl trimellitate, dioctyl phthalate, nonyl undecyl phthalate, dioctyl adipate, tricresyl phosphate, trimethyl pentanyl diisobutyrate, and mixtures thereof. Most often, phthalates and trimellitates are used, in particular octyl trimellitate. By way of example, mention may be made of the products marketed by the company POLYNT under the names Diplast® TM/ST and Diplast® TM79, the products marketed by the company ADEKA PALMAROLE, under the name CIZER® C8L, and the products marketed by the company. EASTMAN company under the name TXIB®. Mixtures of these products may be used as a plasticizer.

The organic solvent used in the composition (A0) may be a solvent whose boiling temperature is preferably at least 200° C. The use of such a solvent avoids too rapid vaporization at the time of application of the composition on a molded part, and thus avoids operators coming into contact with volatile organic compounds. Preferably, the organic solvent is chosen from isophorone, pentyl acetate, alkyl lactate, in particular ethyl lactate, the dibasic esters of adipic, glutaric and succinic acids, and mixtures thereof, in particular mixtures of dimethyl adipate, dimethyl glutarate and dimethyl succinate. As an example of a solvent, mention may be made of the product marketed by ExxonMobil under the trade name EXXSOL D140®.

In order to vary the viscosity of the composition (A0) within the ranges defined above, a rheology additive may be added. In particular, it may be necessary to lower the viscosity of the composition (A0) by using a viscosity-lowering agent. It may be a volatile diluent, an emulsifier or a protective colloid. The diluents may, in particular, include low boiling hydrocarbons such as C10-C16 hydrocarbons. Emulsifiers include salts or esters of fatty acids, condensates of ethylene oxide with alkyl phenyls, or fatty alcohols, zinc/magnesium octoate. Protective colloids are, for example, lecithins. The amount of rheology additive added in the composition (A0) is generally 5 to 100 parts by weight, per 100 parts by weight of resin. By way of example of a rheology additive, mention may be made of the carboxylic acid esters sold under the trade name VISCOBYK 5100® by BYK CHEMIE GmbH.

The composition (A0) may further comprise one or more additives, selected from fillers, stabilizers, antioxidants, processing additives, lubricants or flame retardants. In particular, among the additives commonly used in compositions based on vinyl resin, mention may be made of metal salts of organic carboxylic acid, organic phosphoric acids, zeolites, hydrotalcites, epoxidized compounds, beta-diketones, polyhydric alcohols, phosphorus, sulfur or phenolic antioxidants, ultraviolet absorbers, for example benzophenones, benzotriazoles, and oxanilide derivatives, cyanoacrylates, hindered amine light stabilizers (HALS) with hindered alkoxyamine or Alkoxyamine hindered amine light stabilizer (NOR HALS), in particular the products marketed by Clariant under the name Hostavin Now®, perchloric acid salts, and other inorganic compounds based on metals, lubricants for example organic waxes, fatty alcohols, fatty acids, esters, metal salts, fillers, for example chalk or talc, blowing agents, for example azodicarbonamides.

Composition A:

The composition (A) comprises at least one thermoplastic resin preferably chosen from polyvinyl chloride (PVC) or a mixture of PVC and a compatible polymer chosen from copolymers or terpolymers vinyl chloride and vinyl acetate (VC/VA) or vinyl chloride and acrylic derivative (VC/AD), PVC/nitrile copolymers, mono- or bicomponent polyurethanes, especially thermoplastic polyurethanes (TPU), thermoplastic polyetheresters, ethylene/vinyl monomer (EVA) copolymers ethylene/vinyl monomer/carbonyl terpolymers, melt-processable acrylic elastomers, polyamide and polyether block copolymers or polyetherblockamides, chlorinated or chlorosulfonated polyethylenes, ethylene/alkyl (meth) acrylate polymers or (meth) acrylic acid functionalized or not, MBS core-shell polymers, SBM block terpolymers, PVDF and polyamide resins The composition (A) may further comprise one or more stabilizers. In fact, under the effect of heat, oxygen and/or UV, the thermoplastic resin, especially PVC, tends to degrade. The composition (A1) may therefore comprise:
  One or more thermal stabilizers, for example selected from among metal salts, for example alkali metal salts or alkaline earth or transition metals, for example calcium salts, barium salts or zinc salts; and/or complexes based on aluminum, potassium or sodium; and/or
  One or more anti-UV stabilizers chosen from among benzotriazoles and cyanoacrylates.

The composition (A) according to the invention may further comprise fillers. In general, fillers are inert substances, generally mineral, which make it possible to modify certain properties, for example mechanical, electrical, thermal, etc. The fillers are chosen, in particular, from calcium carbonates (natural or precipitated), calcined kaolins, talc, dolomites, barium sulfate and metal oxides.

The composition (A) according to the invention may also comprise at least one pigment. The pigments are chosen, in particular, from:
  Organic dyes of azo, anthraquinone type;
  Inorganic pigments, chosen, in particular, from titanium oxides, iron oxides, chromium oxides, manganese oxides, cobalt oxides;
  Organometallic compounds, for example copper phthalocyanines;
  Carbon blacks;
  Metallized pigments, for example aluminum pigment, interference pigment.

The composition (A) may further comprise other additives such as antistatic compounds, fungicides, swelling agents, gel enhancers, etc.

In one embodiment, the composition (A) is a composition (A1).

In another embodiment, the composition (A) is a composition (A2).

Composition A1:

The composition (A1) comprises at least one thermoplastic resin such as that described for the composition (A), preferably PVC or mono- or bi-component polyurethane or PVC/nitrile copolymer, preferably PVC. Preferably, the composition (A1) is in liquid form. Preferably, the thermoplastic resin is obtained by an emulsion or microsuspension process. The thermoplastic resin is preferably in the form of particles whose average diameter may go up to micron.

The composition (A1) further comprises at least one plasticizer, preferably an organic plasticizer. Preferably, the plasticizers are chosen from phthalic and trimellitic, phosphoric and adipic esters. The plasticizers may also be chosen from polymeric plasticizers, for example polyadipates.

The composition (A1) may further comprise one or more stabilizers. In fact, under the effect of heat, oxygen and/or UV, the thermoplastic resin, especially PVC, tends to degrade. The composition (A1) may therefore comprise:
  One or more thermal stabilizers, for example selected from among metal salts, for example alkali metal salts or alkaline earth or transition metals, for example calcium salts, barium salts or zinc salts; and/or complexes based on aluminum, potassium or sodium; and/or
  One or more anti-UV stabilizers chosen from among benzotriazoles and cyanoacrylates.

The composition (A1) according to the invention may further comprise fillers. In general, fillers are inert substances, generally mineral, which make it possible to modify certain properties, for example mechanical, electrical, thermal, etc. The fillers are chosen, in particular, from among calcium carbonates (natural or precipitated), calcined kaolins, talc, dolomites, barium sulfate and metal oxides.

The composition (A1) according to the invention may further comprise at least one pigment. The pigments are chosen, in particular, from among:
  Organic dyes of azo, anthraquinone type;
  Inorganic pigments, chosen, in particular, from among titanium oxides, iron oxides, chromium oxides, manganese oxides, cobalt oxides;
  Organometallic compounds, for example copper phthalocyanines;
  Carbon blacks;
  Metallized pigments, for example aluminum pigment, interference pigment.

The composition (A1) may further comprise other additives such as antistatic compounds, fungicides, swelling agents, gel enhancers, etc.

Preferably, the composition (A1) comprises:
  from 40 to 50% by weight, preferably 45 to 50% by weight, of thermoplastic resin;
  from 25 to 40% by weight, preferably from 30 to 40% by weight, of plasticizer;
  from 5 to 10% by weight, preferably from 8 to 10% by weight, of solvent;
  from 0 to 5% by weight, preferably from 3 to 5% by weight, of pigment;
  from 0 to 3% by weight, preferably from 1 to 3% by weight, of additives;
  from 0 to 3% by weight, preferably from 1 to 3% by weight, of filler;
  from 0 to 5% by weight, preferably from 3 to 5% by weight, of thermal stabilizer.

The composition (A1) may be applied without prior heating of the mold or after heating to reach a mold temperature of between 20 and 50° C.

Composition A2:

The composition (A2) comprises at least one thermoplastic resin, in particular as defined for the composition (A), preferably chosen from polyvinyl chloride (PVC) or a mixture of PVC and a compatible polymer chosen from copolymers or terpolymers vinyl chloride and vinyl acetate (VC/VA) or vinyl chloride and acrylic derivative (VC/AD), thermoplastic polyurethanes (TPU), thermoplastic polyetheresters, ethylene/vinyl monomer copolymers (EVA), ethylene terpolymers/vinyl monomer/carbonyl, melt-processable acrylic elastomers, polyamide and polyether block copolymers or polyetherblockamides, chlorinated or chlorosulfonated polyethylenes, ethylene/alkyl (meth) acrylate or (meth) acrylic acid polymers functionalized or not, MBS core-shell polymers, SBM block terpolymers, PVDF and polyamide resins powder. According to a preferred embodiment of the invention, the thermoplastic resin used is a Kwert polyvinyl chloride (PVC) of between 50 and 100.

According to one embodiment, the thermoplastic resin of the composition (A2) is polyvinyl chloride (PVC) obtained by a suspension or micro-suspension method, but emulsion or bulk PVC may also be used. An example of VC/VA copolymer is Lacovyl® from Arkema, an example of VC/AD copolymer is Vinnolit® from Vinnolit, an example of TPU is Goodrich's Estane®, an example of thermoplastic polyetherester is DuPont's Hytrel®, an example of polyetherblockamide is Pebax® from Arkema, an example of EVA is Evatane® from Arkema, an example of ethylene/vinyl monomer/carbonyl terpolymer is Elvaloy® from DuPont, examples of ethylene/alkyl (meth) acrylate or acidic polymers (Meth) acrylic functionalized or otherwise are Lotryl®, Lotader® and Orevac® from Arkema, an example of chlorinated or chlorosulfonated polyethylenes is DuPont's Tyrin®, an example of a processable acrylic elastomer in the molten state is Alcryn® from Apa, an example of polyamide powder resins is Orgasol® from Arkema. These polymers compatible with PVC, called "allies", have good cold properties, and are likely to confer a suitable brittleness to the layers containing them.

The composition (A2) may thus comprise mixtures of thermoplastic resins comprising PVC resins and copolymers or terpolymers vinyl chloride and vinyl acetate (VC/VA) or vinyl chloride and acrylic derivative (VC/AD), as well as PVC resins and thermoplastic polyurethanes (TPU). These different resins may be mixed together in large proportions.

The composition (A2) may also comprise a plasticizer or a plasticizer mixture as defined above for the compositions (A) and (A1). The ratio by weight of the thermoplastic resin to the plasticizer in the composition (A2) is then between 1:0.1 and 1:2, and preferably between 1:0.5 and 1:1. This ratio makes it possible to obtain a resin that is particularly resistant to abrasion.

The composition (A2) may further comprise at least one pigment, in particular as defined for the compositions (A) and (A1).

The composition (A2), preferably in the form of a powder, may be deposited according to the usual molding techniques such as spraying or rotational molding. Spraying consists of a deposit of a powder on the mold based on an electrostatic effect.

Rotational molding involves applying a strictly necessary amount of powder into the mold while applying rotational movements to the mold, which allows the powder to be deposited on the surface of the mold. When a quantity of powder is introduced into the mold that is greater than that required for the rotational deposition, the excess quantity after deposition of the powder on the mold may be eliminated by gravity. This technique is known as "slush-molding" or slugging. This latter deposition technique is particularly preferred. In "slush-molding", the composition (A2), in powder form, is deposited by rotation of the entire device which comprises the mold as well as the reservoir for depositing the composition (A2). The number of rotations of the device is chosen according to the thickness of the desired composition layer (A2).

Preferably, the composition (A2) comprises:
from 45 to 55% by weight, preferably from 50 to 55% by weight, of thermoplastic resin;
from 35 to 4% by weight, preferably from 40 to 45% by weight, of plasticizer;
from 0 to 3% by weight, preferably from 1 to 3% by weight, of pigment;
from 0 to 3% by weight, preferably from 1 to 3% by weight, of additives;
from 0 to 3% by weight, preferably from 1 to 3% by weight, of filler;
from 0 to 3% by weight, preferably from 1 to 3% by weight, of thermal stabilizer.

Before the step of depositing the composition (A2), the mold is heated to a mold temperature of between 150 and 360° C., preferably between 180 and 260° C.

Thus, in one embodiment, the method of the invention comprises the steps of:
a) Provide a mold;
b) Apply a composition (A1) comprising at least one thermoplastic resin at the bottom of the mold;
c) Heat the mold, preferably to a temperature between 70 and 300° C., preferably between 100 and 220° C.;
d) Apply the textile to the heated thermoplastic resin;
e) Cool the mold;
f) Remove mold.

Optionally, before step b) the mold is heated to reach a mold temperature of between 20 and 50° C.

In one embodiment, the method of the invention comprises the steps of:
a) Provide a mold;
b) Apply a composition (A1) comprising at least one thermoplastic resin at the bottom of the mold;
a1) Heat the mold preferably to a temperature between 20 and 100° C., preferably between 50 and 100° C., and apply on all or part of the mold a composition (B), and then heat the mold;
c) Heat the mold, preferably to a temperature between 70 and 300° C., preferably between 100 and 220° C.;
d) Apply the textile to the heated thermoplastic resin;
e) Cool the mold;
f) Remove mold.

Optionally, before step b), the mold may be heated to a mold temperature of between 20 and 50° C.

In another embodiment, the method according to the invention comprises the following steps:
a) Provide a mold;
a0) Apply on all or part of the mold a varnish composition (A0) at the bottom of the mold;
b) Apply a composition (A1) comprising at least one thermoplastic resin;
c) Heat the mold, preferably to a temperature between 70 and 300° C., preferably between 100 and 220° C.;
d) Apply the textile to the heated thermoplastic resin;
e) Cool the mold;
f) Remove mold.

Optionally, before step b) the mold obtained in step a0) is heated to a mold temperature of between 20 and 50° C.

In another embodiment, the method according to the invention comprises the following steps:
a) Provide a mold;
a0) Apply on all or part of the mold a varnish composition (A0) at the bottom of the mold;
b) Apply a composition (A1) comprising at least one thermoplastic resin;
a1) Heat the mold preferably to a temperature between 20 and 100° C., preferably between 50 and 100° C., and apply on all or part of the mold a composition (B);
c) Heat the mold, preferably to a temperature between 70 and 300° C., preferably between 100 and 220° C.;

c) Apply the textile to the heated thermoplastic resin;
d) Cool the mold;
e) Remove mold.

Optionally, before step b) the mold obtained in step a0) may be heated to a mold temperature of between 20 and 50° C.

In another embodiment, the method according to the invention may also comprise the following steps:
a) Provide a mold;
a0) Apply on all or part of the mold a varnish composition (A0) at the bottom of the mold;
a1) Heat the mold preferably to a temperature between 20 and 100° C., preferably between 50 and 100° C., and apply on all or part of the mold a composition (B);
b) Apply a composition (A1) comprising at least one thermoplastic resin;
c) Heat the mold, preferably to a temperature between 70 and 300° C., preferably between 100 and 220° C.;
d) Apply the textile to the heated thermoplastic resin;
e) Cool the mold;
f) Remove mold.

Optionally, before step b) the mold obtained in step a1) may be heated to a mold temperature of between 20 and 50° C.

In another embodiment, the method according to the invention may also comprise the following steps:
a) Provide a mold;
a1) Heat the mold preferably to a temperature between 20 and 100° C., preferably between 50 and 100° C., and apply on all or part of the mold a composition (B);
b) Apply a composition (A1) comprising at least one thermoplastic resin;
c) Heat the mold preferably to a temperature between 70 and 300° C., preferably between 100 and 220° C.;
d) Apply the textile to the heated thermoplastic resin;
e) Cool the mold;
f) Remove mold.

Optionally, before step b) the mold obtained in step a1) may be heated to a mold temperature of between 20 and 50° C.

In another embodiment, the method of the invention may comprise the following steps:
a) Provide a mold;
b) Heat the mold preferably to a temperature between 150 and 360° C., preferably between 180 and 260° C., and apply a composition (A2) comprising at least one thermoplastic resin and at least one pigment in the bottom of the mold;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method of the invention may comprise the following steps:
a) Provide a mold;
b) Heat the mold preferably to a temperature between 150 and 360° C., preferably between 180 and 260° C. and apply a composition (A2) comprising at least one thermoplastic resin and at least one pigment at the bottom of the mold;
b2) Cool the mold to a temperature between 20 and 100° C., preferably between 50 and 100° C.,
a1) Apply on all or part of the mold a composition (B);
c) Heat the mold, preferably to a temperature between 70 and 300° C., preferably between 100 and 200° C.;
d) Apply the textile to the heated thermoplastic resin;
e) Cool the mold;
f) Remove mold.

In another embodiment, the method according to the invention may also comprise the following steps:
a) Provide a mold;
a0) Apply on all or part of the mold a varnish composition (A0) at the bottom of the mold;
b) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method according to the invention may also comprise the following steps:
a) Provide a mold;
a0) Apply on all or part of the mold a varnish composition (A0) at the bottom of the mold;
b) Heat the mold preferably to a temperature between 150 and 360° C., preferably between 180 and 260° C. and apply a composition (A2) comprising at least one thermoplastic resin;
b2) Cool the mold to a temperature between 20 and 100° C., preferably between 50 and 100° C.,
a1) Apply a composition (B) on all or part of the mold;
c) Heat the mold, preferably to a temperature between 70 and 300° C., preferably between 100 and 200° C.;
d) Apply the textile to the heated thermoplastic resin;
e) Cool the mold;
f) Remove mold.

In another embodiment, the method according to the invention may also comprise the following steps:
a) Provide a mold;
a0) Apply on all or part of the mold a varnish composition (A0) at the bottom of the mold;
a1) Heat the mold preferably to a temperature between 20 and 100° C., preferably between 80 and 100° C., and apply a composition (B) on all or part of the mold;
b) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method according to the invention may also comprise the following steps:
a) Provide a mold;
a1) Heat the mold preferably to a temperature between 20 and 100° C., preferably between 50 and 100° C., and apply on all or part of the mold a composition (B);
b) Heat the mold preferably to a temperature between 150 and 360° C., preferably between 180 and 260° C. and apply a composition (A2) comprising at least one thermoplastic resin; p1 c) Heat the mold preferably to a temperature between 70 and 300° C., preferably between 100 and 260° C.;
d) Apply the textile to the heated thermoplastic resin;
e) Cool the mold;
f) Remove mold.

The composition (A1) may be applied by scraping on the mold, or on the mold obtained following steps a0) or a1), or by spraying, in particular as a function of the desired thickness. For example, spraying can be used for a thickness of between 20 and 150 μm, and scraping may be used for a thickness of 150 to 1.5 mm. In the case where the thickness of the layer (A1) is less than or equal to 500 μm, preferably less than or equal to 400 μm, the method of the invention comprises an additional step of applying the composition (A2).

Thus, in one embodiment, the method of the invention may comprise the following steps:
a) Provide a mold;
b) Apply a composition (A1) comprising at least one thermoplastic resin at the bottom of the mold;
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

Optionally, before step b) the mold obtained in step a) is heated to reach a mold temperature of between 20 and 50° C.

Thus, in one embodiment, the method of the invention may comprise the following steps:
a) Provide a mold;
b) Apply a composition (A1) comprising at least one thermoplastic resin at the bottom of the mold;
a1) Heat the mold preferably to a temperature between 20 and 100° C., preferably between 50 and 100° C., and apply a composition (B) on all or part of the mold;
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

Optionally, before step b), the mold obtained in step a) is heated to a mold temperature of between 20 and 50° C.

In another embodiment, the method according to the invention may also comprise the following steps:
a) Provide a mold;
a0) Apply on all or part of the mold a varnish composition (A0) at the bottom of the mold;
b) Apply a composition (A1) comprising at least one thermoplastic resin;
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

Optionally, before step b), the mold obtained in step a0) may be heated to a mold temperature of between 20 and 50° C.

Thus, in one embodiment, the method of the invention may comprise the following steps:
a) Provide a mold;
a0) Apply on all or part of the mold a varnish composition (A0) at the bottom of the mold;
b) Apply a composition (A1) comprising at least one thermoplastic resin at the bottom of the mold;
a1) Heat the mold preferably to a temperature between 20 and 100° C., preferably between 50 and 100° C., and apply on all or part of the mold a composition (B);
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

Optionally, before step b) the mold obtained in step a0) is heated to a mold temperature of between 20 and 50° C.

In another embodiment, the method according to the invention may also comprise the following steps:
a) Provide a mold;
a0) Apply on all or part of the mold a varnish composition (A0) at the bottom of the mold;
a1) Heat the mold preferably to a temperature between 20 and 100° C., preferably between 50 and 100° C., and apply a composition (B on all or part of the mold);
b) Apply a composition (A1) comprising at least one thermoplastic resin;
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

Optionally, before step b), the mold obtained in step a1) may be heated to a mold temperature of between 20 and 50° C.

In another embodiment, the method according to the invention may also comprise the following steps:
a) Provide a mold;
a1) Heat the mold preferably to a temperature between 20 and 100° C., preferably between 50 and 100° C., and apply on all or part of the mold a composition (B);
b) Apply a composition (A1) comprising at least one thermoplastic resin;
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

Optionally, before step b) the mold obtained in step a1) is heated to a mold temperature of between 20 and 50° C.

In another embodiment, the method according to the invention may also comprise the following steps:
a) Provide a mold;
b) Apply a composition (A1) comprising at least one thermoplastic resin;
b1) Heat the mold preferably to a temperature between 150 and 360° C., preferably between 180 and 260° C., and apply a composition (A2) comprising at least one thermoplastic resin;

b2) Cool the mold to a temperature between 20 and 100° C., preferably between 50 and 100° C., a1) Apply a composition (B) on all or part of the mold;

c) Heat the mold preferably to a temperature between 70 and 300° C., preferably between 100 and 260° C.;

d) Apply the textile to the heated thermoplastic resin;

e) Cool the mold;

f) Remove mold.

Optionally, before step b) the mold obtained in step a) may be heated to reach a mold temperature of between 20 and 50° C.

In another embodiment, the method according to the invention may also comprise the following steps:

a) Provide a mold;

a0) Apply on all or part of the mold a varnish composition (A0) at the bottom of the mold and then heating the mold; p1 b) Apply a composition (A1) comprising at least one thermoplastic resin;

b1) Heat the mold preferably to a temperature between 150 and 360° C., preferably between 180 and 260° C., and apply a composition (A2) comprising at least one thermoplastic resin;

b2) Cool the mold to a temperature between 20 and 100° C., preferably between 50 and 100° C., a1) Apply a composition (B) on all or part of the mold;

c) Heat the mold preferably to a temperature between 70 and 300° C., preferably between 100 and 200° C.;

d) Apply the textile to the heated thermoplastic resin;

e) Cool the mold;

f) Remove mold.

Optionally, before step b) the mold obtained in step a0) is heated to a mold temperature of between 20 and 50° C.

The composition (A2), advantageously in the form of a powder, is poured or applied onto the mold, the composition (A0), (A1) or (B). Before depositing the composition (A2), the mold must be heated to a mold temperature of between 150° C. and 300° C., preferably between 180° C. and 260° C., and most preferably between 200° C. and 230° C. During the application of the composition (A2) to the mold, the temperature of the mold may decrease to a temperature of between 130 and 190° C.

In order for the composition layer (A2) to adhere properly to the mold or to the mold coated with the composition (A0), (B) or (A1), the application temperature of the composition (A2), called the dusting temperature, must be included in the ranges defined above. In fact, during the deposition step of the composition (A2), the first composition grains (A2) falling must gel quickly and stick to the mold or, where appropriate, to one of the compositions (A0), (A1) or (B). The following grains stick to the first grains and also gell by mixing their chains of thermoplastic resin, in particular PVC, with those of the surrounding grains (interpenetration of the chains, in particular PVC chains). If the temperature is too low, the first grains can not start to gel so they will not stick to the envelope. The resin grains, in particular PVC resin, will not stick together and a poorly gelled porous structure will be obtained.

After application of the composition (A2), the mold is heated, before application of the textile, until gelation of the composition (A2), i.e. preferably to a temperature between 150° C. and 300° C. This temperature is chosen according to the nature of the thermoplastic resin to be transformed. Thus for polyvinyl chloride it is advantageously between 180° C. and 260° C., and preferably between 230° C. and 250° C. The compositions (A1) and (A2) may be deposited in one or more passes.

Composition (B):

The composition (B) according to the invention is an ink composition which makes it possible to provide colored elements on the part. This composition (B) preferably has a viscosity of preferably between 5 and 40 mPa·s and even more preferably between 8 and 25 mPa·s at 20° C., measured with a BROOKFIELD® viscometer.

Preferably, the composition (B) comprises, by weight relative to the weight of the composition:

5 to 20%, preferably 10 to 15%, of at least one thermoplastic or thermosetting resin whose particles have a size between 0.1 and 10 μm, preferably between 0.1 and 5 μm;

1 to 20%, preferably 5 to 15%, of at least one modifying agent (also called coloring agent);

5 to 20%, preferably 10 to 15%, of at least one plasticizer, and 45 to 75%, preferably 50 to 70%, of at least one organic solvent or water.

Particularly advantageously, this composition (B) may be projected through printing nozzles of small diameter, for example with a diameter of 40 μm, or even with a diameter of 30 μm or 20 μm, in order to obtaining a printed surface of high quality. It is thus possible to obtain an impression, for example, in 360, 600, 720, 1000 or 1400 dpi in one or two passes of a print head on a support.

The resin may be a thermosetting resin, or "thermosettable" resin, and, in particular among the thermosetting resins, those comprising epoxy, isocyanate or acidic units, which lead to obtaining epoxy, polyurethane or polyester type thermosetting networks, are preferred.

Preferably, the resin is a thermoplastic resin. In this case, the ratio by weight of the thermoplastic resin to the plasticizer is between 1:0.1 and 1:2, and preferably between 1:0.5 and 1:1. This ratio makes it possible to obtain a resin that is particularly resistant to abrasion.

The thermoplastic resins may be chosen from polyvinyl chloride, chlorinated polyvinyl chloride (CPVC), acrylic polymers, UV inks, latices, vinyl chloride copolymers, for example copolymers of vinyl chloride and vinyl acetate, and polyvinylidene fluoride, polyamides such as polyamide 11 and polyamide 12, high-density polyethylene and polymethyl methacrylate. Advantageously, polyvinyl chloride and polymethyl methacrylate and copolymers of vinyl chloride and vinyl acetate are chosen. Preferably, the thermoplastic resin is a polyvinyl chloride (or PVC) resin obtainable by an emulsion, suspension or microsuspension process. By way of example, mention may be made of the resin sold under the name Pevikon® P1510 by the company INEOS.

The UV inks generally consist of at least one coloring agent, a carrier generally comprising a reactive diluent of the monomer type and at least one prepolymer, at least one additive and at least one photoinitiator. The coloring agents are generally present in the UV ink composition in a proportion of 15 to 20% by weight based on the weight of the composition, and are as described below. The coloring agents are generally crystalline compounds of organic origin. The photoinitiators are generally included in a proportion of less than 10% by weight relative to the weight of the UV ink composition. A mixture of different photoinitiators is generally used in order to better absorb the UV radiation; the photoinitiators may, in particular, be chosen from aromatic ketones in the case of radical polymerization and onium salts in the case of cationic polymerization, wherein these compounds lead to the formation of free radicals if the polymerization is of a radical type or strong cations and protic acids if it is of a cationic type. In the case of the radical polymerization, the photoinitiators are often used in excess to compensate for the presence of oxygen in the air which inhibits the free-radical initiator, a synergistic amine or a photosensitizer may be advantageously added to increase the absorption of UV radiation and accelerate their decomposition. The macromonomers or prepolymers used at about 30% by weight of the UV ink composition act as a resin because they have a high molecular weight (>500 g/mol-1). They give the ink film mechanical properties, chemical resistance or adhesion to the substrate. They may be coupled with inert resins to optimize these properties. In the case of radical polymerization, they are most often of an acrylic nature, whereas in the case of a cationic mechanism, they are mainly oxiranes or vinyl ethers. Examples of prepolymers are in particular epoxy-acrylate resins, polyurethane acrylate resins, polyester urethane acrylate resins, polyester acrylate resins, polyether acrylate resins, bicycloaliphatic epoxy resins, divinyl ether resins, glycidyl vinyl ether resins. The reactive monomers or diluents representing about 25% by weight of the UV ink composition constitute the "solvent" of the carrier because they have low molecular weights (<500 g/mol-1). They play the role of plasticizer by regulating the viscosity of the carrier. It is most often a mixture of mono- and multifunctional monomers which will copolymerize with the prepolymers and thus accelerate the crosslinking of the ink film. The additives representing up to 10% by weight of the ink composition are chosen, in particular, from stabilizers to prevent the build-up of the ink during storage, antioxidants prevent the formation of a film on the surface of the ink during storage, plasticizers to give flexibility to the ink film or surfactants, slip or antifoam agents if it is a liquid ink.

The resin of the composition (B) may also be a polyurethane resin or a latex. For the purposes of the present invention, the term "coloring agent" is intended to mean any compound capable of modifying the visual appearance of the molded articles, and, in particular, the pigments.

The pigment(s) used may be both organic and mineral. By way of example, mention may be made of metal oxides, whether coated or not, such as, for example, titanium oxides (amorphous or crystallized in rutile and/or anatase form), iron, zinc, zirconium or cerium and their mixtures. Mention may, in particular, be made of the yellow pigment marketed by CIBA under the name Yellow Cromophtal® PV H3R, titanium dioxide marketed by Kronos under the name KRO-NOS® 2220, the blue pigment marketed by CIBA under the name Cromophtal® 4GNP and mixtures thereof. The pigment used in the composition which is the subject of the invention may be in the form of a pigment paste comprising a mixture of pigment and solvent or a mixture of pigment and plasticizer, optionally mixed with a dispersing agent. Glitter is used in general to make the object more aesthetic. The flake content in the manufactured article is generally from about 5 to about 50 g/cm². Mica-coated titanium oxide flakes are preferably used.

The plasticizer used in the composition which is the subject of the invention is a plasticizer compatible with the thermoplastic resin. The plasticizer may be chosen from esters formed from alcohol and an organic acid such as trimellitic acid, sebacic acid, adipic acid, phthalic acid, citric acid, benzoic acid, tallic acid, glutaric acid, fumaric acid, maleic acid, oleic acid, palmitic acid and acetic acid. In particular, the plasticizer may be chosen from octyl trimellitate, dioctyl phthalate, nonyl undecyl phthalate, dioctyl adipate, tricresyl phosphate, trimethyl pentanyl diisobutyrate, and mixtures thereof. Most often, phthalates and trimellitates are used, in particular octyl trimellitate. By way of example, mention may be made of the products marketed by the company POLYNT under the names Diplast® TM/ST and Diplast® TM79, the products marketed by the company ADEKA PALMAROLE, under the name CIZER® C8L, and the products marketed by the company. EASTMAN company under the name TXIB®. Mixtures of these products may be used as a plasticizer.

The organic solvent used in the composition (B) may be a solvent whose boiling temperature is preferably at least 200° C. The use of such a solvent makes it possible to avoid too rapid vaporization at the time of application to a molded part of the composition which is the subject of the invention, and thus prevent operators from coming into contact with volatile organic compounds. Preferably, the organic solvent is chosen from isophorone, pentyl acetate, alkyl lactate, in particular ethyl lactate, the dibasic esters of adipic, glutaric and succinic acids, and mixtures thereof, in particular mixtures of dimethyl adipate, dimethyl glutarate and dimethyl succinate. As an example of a solvent, mention may be made of the product marketed by ExxonMobil under the trade name EXXSOL D140®.

In order to vary the viscosity of the composition (B) within the ranges defined above, a rheology additive may be added. In particular, it may be necessary to lower the viscosity of the composition (B) by using a viscosity-lowering agent. It may be a volatile diluent, an emulsifier or a protective colloid. The diluents may, in particular, include low boiling hydrocarbons such as C10-C16 hydrocarbons. Emulsifiers include salts or esters of fatty acids, condensates of ethylene oxide with alkyl phenyls, or fatty alcohols, zinc/magnesium octoate. Protective colloids are, for example, lecithins. The amount of rheology additive added in the composition (B) is generally 5 to 100 parts by weight, per 100 parts by weight of thermoplastic resin. By way of example of a rheology additive, mention may be made of the carboxylic acid esters sold under the trade name VISCOBYK 5100® by BYK CHEMIE GmbH.

The composition (B) may further comprise one or more additives selected from fillers, stabilizers, antioxidants, processing additives, lubricants or flame retardants. In particular, among the additives commonly used in compositions based on vinyl resin, mention may be made of metal salts of organic carboxylic acid, organic phosphoric acids, zeolites, hydrotalcites, epoxidized compounds, beta-diketones, polyhydric alcohols, phosphorus, sulfur or phenolic antioxidants, ultraviolet absorbers, for example benzophenones, benzotriazoles, and oxanilide derivatives, cyanoacrylates, hindered amine light stabilizers (HALS), or alkoxyamine hindered amine light stabilizer hindered alkoxyamine (NOR HALS), in particular the products marketed by Clariant under the name Hostavin Now®, perchloric acid salts, and other inorganic compounds based on metals, lubricants, for example, organic waxes, fatty alcohols, fatty acids, esters, metal salts, fillers for example chalk or talc, blowing agents for example azodicarbonamides.

Preferably, during step a1), printing nozzles with a diameter of less than or equal to 40 μm, and preferably with a diameter of 30 μm or 20 μm, are used to deposit the layer of composition (B). Said layer of composition (B) may be deposited on the entire mold or only on part of the mold to allow the creation of a colored pattern on the coated fabric. An example of this is the use of the Omnidot® 760 GS8 printing nozzle from XAAR, Cambridge, UK, other print heads, for example Koninca Minolta KM512® may be used.

Before depositing the composition (B), the mold must preferably be heated to a mold temperature of between 20 and 100° C., preferably between 80 and 100° C.

Particularly advantageously, during step a1), the composition (B) may be deposited with an inkjet printing assembly, said step a1) also comprising a step of controlling said inkjet printing assembly, said printing assembly being equipped with means of displacement and orientation along several axes and at least one control unit of these means. The inkjet printing assembly is, in particular, as defined in the application EP2691240.

The inkjet printing assembly may be further equipped with a composition mixing device (B). The mixing device is, in particular, as defined in application EP2691240.

The inkjet printing unit may be connected to a control unit allowing the opening and closing of valves, flow control by pumps, the speed of rotation of any mixers, etc. Such a control unit is, in particular, defined in the application EP2691240.

The inkjet printing assembly is equipped with means for displacement and orientation along several axes. These displacement means are, in particular, as defined in application EP2691240.

Advantageously, the displacement means (also called robot) are controlled by a device for pre-positioning and then real-time control of the printing heads. A pre-positioning device is in particular as described in patent application EP2691240.

This advantageously makes it possible to very precisely position the composition (B) according to the desired rendering and thus makes it possible to make prints placed for example on the patterns created by the mold.

Preferably, in order to precisely place the composition (B) in the mold, a scan of the mold comprising the location to be printed is performed. The scan is loaded into the inkjet print assembly.

Thus, preferably, the method of the invention comprises the following steps:
a) Provide a mold;
i) Optionally make a scan of the mold and then process the signal obtained to give an image;
ii) Load the image from i) or an image in an inkjet printing assembly;
a0) Optionally deposit a layer of composition (A0) at the bottom of the mold;
a1) After heating the mold obtained in step a) or a0) preferably to a temperature between 20 and 100° C., preferably between 50 and 100° C., deposit the composition (B) with the aid of an inkjet printing assembly according to the loaded image;
b) After optional heating, apply at least one composition (A) comprising at least one thermoplastic resin;
c) Heat the mold;
d) Apply the textile to the heated thermoplastic resin;
e) Cool the mold;
f) Remove mold.

If the printing does not have to be placed on the mold, for example printing over the entire surface of the mold, or if the same mold is used in series and the mold scan has already been performed, the scanning step of the mold is not necessary, so the method according to the invention will comprise the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
a1) After heating the mold obtained in step a) or a0) preferably to a temperature between 20 and 100° C., preferably between 50 and 100° C., deposit the composition (B) using the inkjet printing assembly according to the loaded image;
b) After optional heating, apply at least one composition (A) comprising at least one thermoplastic resin;
c) Heat the mold;
d) Apply the textile to the heated thermoplastic resin;
e) Cool the mold;
f) Remove mold.

Depending on the nature of the composition (A), the mold may be preheated before the application of the composition (A).

In another embodiment, the method of the invention comprises the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
a1) Heat the mold then obtained in step a) or a0) preferably to a temperature between 20 and 100° C., preferably between 50 and 100° C., deposit the composition (B) using the inkjet printing assembly according to the loaded image;
b) Optionally heat the mold to a temperature of between 20 and 50° C., and apply a composition (A1) comprising at least one thermoplastic resin;
c) Heat the mold preferably to a temperature between 70 and 300° C., preferably between 100 and 220° C.;
d) Apply the textile to the heated thermoplastic resin;
e) Cool the mold;
f) Remove mold.

In another embodiment, the method of the invention comprises the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
a1) Heat the mold obtained in step a) or a0) preferably to a temperature between 20 and 100° C., preferably between 50 and 100° C., and deposit the composition (B) using the inkjet printing assembly according to the loaded image;
b) Heat the mold preferably to a temperature between 150 and 360° C., preferably between 180 and 260° C., and then apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method of the invention comprises the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
a1) Heat the mold preferably to a temperature between 20 and 100° C., preferably between 50 and 100° C., and deposit the composition (B) using the ink jet printing assembly as a function of the loaded image;

b) Optionally heat the mold to a temperature between 20 and 50° C., and apply a composition (A1) comprising at least one thermoplastic resin;
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method of the invention comprises the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
b) Optionally heat the mold to a temperature of between 20 and 50° C., and apply a composition (A1) comprising at least one thermoplastic resin;
a1) Heat the mold preferably to a temperature between 20 and 100° C., preferably between 50 and 100° C., and then deposit the composition (B) using the ink jet printing assembly as a function of the loaded image;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method of the invention comprises the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
b) Heat the mold preferably to a temperature between 150 and 360° C., preferably between 180 and 260° C., and then apply a composition (A2) comprising at least one thermoplastic resin;
b2) Cool the mold to a temperature between 20 and 100° C., preferably between 50 and 100° C.,
a1) Deposit the composition (B) using the inkjet printing assembly according to the loaded image;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method of the invention comprises the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
b) Optionally heat the mold preferably to a temperature of between 20 and 50° C., and apply a composition (A1) comprising at least one thermoplastic resin;
b1) Heat the mold preferably to a temperature between 150 and 360° C., preferably between 180 and 260° C., and apply a composition (A2) comprising at least one thermoplastic resin;
b2) Cool the mold to a temperature between 20 and 100° C., preferably between 50 and 100° C., and deposit a composition (B) using the inkjet printing assembly according to the loaded image;
c) Heat the mold preferably to a temperature between 70 and 300° C., preferably between 100 and 260° C.;
d) Apply the textile to the heated thermoplastic resin;
e) Cool the mold;
f) Remove mold.

In another embodiment, the method of the invention comprises the following steps:
a) Provide a mold;
i) Optionally make a scan of the mold and then process the signal obtained to give an image;
ii) Load the image from step i) or an image in an inkjet printing assembly;
a0) Optionally deposit a layer of composition (A0) at the bottom of the mold;
b) Optionally heat the mold preferably to a temperature of between 20 and 50° C., and apply a composition (A1) comprising at least one thermoplastic resin;
a1) Heat the mold preferably to a temperature between 20 and 100° C., preferably between 50 and 100° C., and deposit the composition (B) using the ink jet printing assembly as a function of the loaded image;
b1) Heat the mold preferably to a temperature between 150 and 360° C., preferably between 180 and 260° C., and apply a composition (A2) comprising at least one thermoplastic resin;
c) Heat the mold preferably to a temperature between 70 and 300° C., preferably between 100 and 260° C.;
d) Apply the textile to the heated thermoplastic resin;
e) Cool the mold;
f) Remove mold.

Preferably, in the method of the invention, the composition A1 is deposited so as to obtain from 200 to 2000 g/m$^2$, preferably from 400 to 700 g/m$^2$. Preferably, in the method of the invention, the composition A2 is deposited so as to obtain from 200 to 2000 g/m$^2$, preferably from 400 to 700 g/m$^2$.

A textile is a material that may be obtained by weaving or knitting, especially yarns or fibers, especially textile fibers. A textile is therefore a material that may be divided into fibers or yarns that are woven or knitted together. The present invention also relates to so-called nonwoven fabrics. It is therefore necessary to distinguish textiles with fibers or threads. In the context of the present invention, the textile may be any type of natural or synthetic textile or a mixture thereof. Thus, the textile may be a textile based on polyester, polyamide, cotton or a mixture of these elements. For example, there may be mentioned textiles 100% polyester, 100% polyamide, 100% cotton or textiles comprising a mixture of cotton and polyester, for example 50% cotton and 50% polyester. The textile according to the invention may also be a luminous textile. In the context of the present invention, luminous textile means:
a textile article comprising a light element such as light-emitting diodes (LEDs), organic light-emitting diodes (OLEDs), optical fibers, etc. Each of the LEDs is connected to a wire that allows them to be controlled independently or in groups to allow the display of a text, logo, pattern, etc.

a fiber optic fabric obtained by weaving, knitting, braiding or embroidery. The optical fibers first undergo a mechanical treatment (degradation of the sheathing of the optical fiber by abrasion, curvature beyond the radius of curvature, etc.), thermal (laser treatment) or chemical (solvent treatment) to make them capable of diffusing the light. The fabrics, especially the light fabrics, may be woven to obtain patterns (jacquard weave) or to form a tablecloth. Such light fabrics are in particular sold by the company Brochier Technologies.

Advantageously, the textile according to the invention may be coated, in particular, with a thermoplastic resin, in particular as defined for the compositions (A), (A1) and (A2), preferably PVC.

The textile of the invention may also be pre-coated with an adhesive.

Step d) may be carried out in any manner known to those skilled in the art, in particular by rolling (for example by means of an applicator roll, by simply depositing the textile on the mold, etc.), by pressing, etc.

This step d) of laminating the textile is carried out after the heating step c) or that of c1) where appropriate, when the composition is in the gelled state so as to allow adhesion.

Particularly advantageously, in the context of the method of the invention, the textile may be applied directly to the heated thermoplastic resin, which allows direct adhesion without having to use a textile attachment system, or vacuum to maintain the textile in place in the mold.

In the case where a luminous textile is used, the composition (A) will not include pigments or only little pigment in order to let the light through. Thus, the composition (A) comprises from 0 to 1% of pigment, and preferably from 0.01% to 0.5%.

The cooling step e) may be carried out by spraying water or air.

The mold used in the context of the present invention may be any type of mold for progressive heating in the presence of a thermoplastic resin. Preferably, the mold is a double-jacketed mold with heat transfer fluid circulation.

The mold may be a 2D mold previously etched by any technique known to those skilled in the art, for example by chemical etching, laser, machining, etc. In a particularly advantageous manner, the method of the invention makes it possible to adapt the depth of the engraved patterns to the desired rendering. Thus, it is possible to obtain depths of up to about 0.5 mm for example. The etched pattern may be positive and/or negative.

The mold may also be a 3D mold.

The mold may, for example, be a mold made by electrodeposition of nickel or an engraved steel mold then coated with a nickel layer; the mold may be a steel mold, or a silicone-based mold or any other temperature-resistant polymer, especially at a temperature at least equal to the highest gelification temperatures of the compositions (A0), (A), (A1), (A2) and (B).

The method of the invention advantageously makes it possible to obtain molded composite parts comprising patterns of variable depth, possibly colored, and which may comprise positive and/or negative patterns. These composite parts may advantageously imitate leather. These composite parts may advantageously be intended for the manufacture of leather goods, for example purses, travel bags, public and private furnishings such as sofas, armchairs, articles for seat upholstery, particularly in the automobile, aeronautical, nautical and railway sectors; in the automotive field, these composite parts may be used for the manufacture of headrests, gearshift, armrest, door panel, dashboard liner and cabinetry parts. In a particularly advantageous manner, the method of the invention makes it possible to obtain composite components which are useful in particular for:

100% polyester or polyamide textiles are used for the sheathing of automobile parts for this type of product,. The elongations under 5 daN must be greater than 25% for the product to be used in a sheathing process;

the production of leather goods. The textiles used are preferably textiles consisting of 50% by weight of polyester fibers and 50% by weight of cotton fibers with very high mechanical performance. The textile gives the product important mechanical properties such as breaking strength, resistance to tearing and perforation.

The present application will now be described using non-limiting examples.

EXAMPLE OF IMPLEMENTATION OF THE METHOD ACCORDING TO THE INVENTION

1) Over the entire surface of a mold, a varnish composition (A0) according to the invention is sprayed with a gun. The weight of the deposit of the varnish composition is about 10 $g/m^2 \pm 5$ g in dry matter. The mold is then introduced into an oven heated at 340° C. for 1 min and 30 sec (±10 sec) to reach a mold temperature of between 20 and 100° C.

2) An image is created via software or scanned. The mold surface is scanned to place the created or scanned image exactly where desired. The print head allows the deposition of the composition (B) at the exact location chosen to print the image.

3) A PVC composition (A1) according to the invention is then sprayed onto the mold obtained in 2) with the aid of a spray gun. The deposition weight of this composition (A1) is about 150 $g/m^2 \pm 30$ $g/m^2$.

The mold is then heated for 5 min±30 sec at 340° C. to achieve a mold temperature of between 150 and 360° C. During this step the composition (A1) is gelled.

4) The mold obtained in step 3) is coupled to a powder tank comprising the PVC composition (A2) according to the invention in powder form. The assembly rotates for about 30 seconds in order to obtain a thickness of the vinyl product of about 0.6 mm. The mold is then re-introduced to an oven at 340° C. for 1 minute to effect the post-gelation operation and reach a mold temperature of between 70 and 300° C. This is a step to gel all the PVC material.

5) At the end of step 4) a textile is applied directly to the outlet of the oven, pressure is applied to obtain a mechanical anchoring of the fabric and thus have a good adhesion.

6) The assembly is then cooled either by water or by air, and after demolding a printed debossed/embossed fabric is obtained.

EXAMPLE OF IMPLEMENTATION OF THE METHOD ACCORDING TO THE INVENTION

1) A varnish composition (A0) according to the invention is sprayed with a gun over the entire surface of a mold. The weight of the deposit of the varnish composition is about 10 $g/m^2 \pm 5$ g in dry matter. The mold is then introduced into an oven heated at 340° C. for 1 min and 30 sec (±10 sec) to reach a mold temperature of between 20 and 100° C.

2) An image is created via software. The print head allows the deposition of the composition (B) at the exact location chosen to print the image.

3) A PVC composition (A1) according to the invention is then scraped on the mold obtained in 2) using a doctor blade. The deposition weight of this composition (A1) is about $650/m^2 \pm 50$ g/m$^2$. The mold is then heated for 5 min±30 sec at 340° C. to achieve a mold temperature of between 150 and 360° C. During this step the composition (A1) will gel.

4) At the end of step 3), a textile is applied directly to the outlet of the oven, pressure is applied to obtain mechanical anchoring of the fabric and thus provide good adhesion.

5) The assembly is then cooled either by water or by air, and after demolding a debossed printed embossed fabric is obtained.

EXAMPLE OF IMPLEMENTATION OF THE METHOD ACCORDING TO THE INVENTION

1) A varnish composition (A0) according to the invention is sprayed with a gun over the entire surface of a mold. The weight of the deposit of the varnish composition is about 10 g/m$^2 \pm 5$ g in dry matter. The mold is then introduced into an oven heated at 340° C. for 1 min and 30 sec (±10 sec) to reach a mold temperature of between 20 and 100° C.

2) A PVC composition (A1) according to the invention is then scraped on the mold obtained in 2) using a doctor blade. The deposition weight of this composition (A1) is about $650/m^2 \pm 50$ g/m$^2$. The mold is then heated for 1 min±30 sec at 340° C. to reach a mold temperature of between 50 and 150° C. During this step the composition (A1) is pregelled 3) An image is created via software. The print head allows the deposition of the composition (B) at the exact location chosen to print the image on the pre-gelled composition A1.

4) The mold is then reheated for 5 minutes±30 sec at 340° C. to achieve a mold temperature of between 150 and 360° C. During this step the composition (A1) will gel.

5) At the end of step 4) a textile is applied directly at the outlet of the oven, a pressure is applied to obtain mechanical anchoring of the fabric to provide good adhesion.

6) The assembly is then cooled either by water or by air, and after demolding a debossed/embossed printed fabric is obtained.

The invention claimed is:

1. A method for manufacturing a textile composite part comprising a textile and a thermoplastic resin, the method comprising, in the following order:
    a) providing a mold having a bottom;
    a0) depositing a varnish composition at the bottom of the mold, heating the mold to produce a varnish layer as an external surface of the textile composite part;
    a1) depositing a colored composition comprising at least one thermoplastic or thermosetting resin on all or a portion of the varnish layer, heating the mold, providing colored pattern(s), and obtaining a varnish layer having this/these colored pattern(s);
    b) applying at least one composition (A), comprising at least one thermoplastic resin, on top of the varnish layer;
    c) heating the mold including the at least one composition (A);
    d) applying a textile to the heated composition (A);
    e) cooling the mold; and
    f) removing the textile composite part from the mold, the textile composite part comprising an external surface that is made of the varnish layer through which the colored pattern(s) is/are visible.

2. The method according to claim 1, wherein in step b) composition (A) comprises polyvinyl chloride (PVC) and plasticizer.

3. The method according to claim 1, wherein in step b) composition (A) comprises a resin selected from the group consisting of polyvinyl chloride (PVC), a mixture of PVC and a copolymer or terpolymer of vinyl chloride and vinyl acetate, a mixture of PVC and a copolymer or terpolymer of vinyl chloride and acrylic derivative, PVC/nitrile copolymers, mono- or bicomponent polyurethanes, thermoplastic polyurethanes (TPU), thermoplastic polyetheresters, ethylene/vinyl monomer copolymers, ethylene/vinyl monomer/carbonyl terpolymers, melt-processable acrylic elastomers, polyamide and polyether block copolymers, chlorinated or chlorosulfonated polyethylenes, ethylene/alkyl (meth) acrylate polymers, MBS core-shell polymers, SBM block terpolymers, PVDF and polyamide resins.

4. The method according to claim 1, further comprising further applying on composition (A) a composition (A2) comprising at least one thermoplastic resin selected from the group consisting of copolymers or terpolymers vinyl chloride and vinyl acetate (VC/VA) or vinyl chloride and acrylic derivative (VC/AD), thermoplastic polyurethanes (TPU), thermoplastic polyetheresters, ethylene/vinyl monomer copolymers (EVA), ethylene terpolymers/vinyl monomer/carbonyl, melt-processable acrylic elastomers, polyamide and polyether block copolymer, polyetherblockamides, chlorinated or chlorosulfonated polyethylenes, ethylene/alkyl (meth) acrylate or (meth) acrylic acid polymers, MBS core-shell polymers, SBM block terpolymers, PVDF, and polyamide resins powder.

5. The method according to claim 1, wherein step a) of providing the mold further comprises the steps of:
    i) making or providing a scan of the mold and then processing a signal obtained of the scanned mold to provide an image; and
    ii) loading the image from step i) or an image in an inkjet printing assembly; and
    wherein at step a1) the deposition of the colored composition is carried out with the aid of the inkjet printing assembly according to the loaded image.

6. The method according to claim 2, wherein step a) of providing the mold further comprises the steps of:
    i) making or providing a scan of the mold and then processing a signal obtained of the scanned mold to provide an image; and
    ii) loading the image from step i) or an image in an inkjet printing assembly; and
    wherein at step a1) the deposition of the colored composition is carried out with the aid of the inkjet printing assembly according to the loaded image.

7. The method according to claim 3, wherein step a) of providing the mold further comprises the steps of:
    i) making or providing a scan of the mold and then processing a signal obtained of the scanned mold to provide an image; and
    ii) loading the image from step i) or an image in an inkjet printing assembly; and
    wherein at step a1) the deposition of the colored composition is carried out with the aid of the inkjet printing assembly according to the loaded image.

8. The method according to claim 4, wherein step a) of providing the mold further comprises the steps of:
    i) making or providing a scan of the mold and then processing a signal obtained of the scanned mold to provide an image; and
    ii) loading the image from step i) or an image in an inkjet printing assembly;

wherein at step a1) the deposition of the colored composition is carried out with the aid of the inkjet printing assembly according to the loaded image.

9. The method according to claim 1, wherein step a) of providing the mold further comprises the steps of:
   i) making or providing a scan of the mold and then processing a signal obtained of the scanned mold to provide an image; and
   ii) loading the image from step i) or an image in an inkjet printing assembly; and
   wherein after step a0) the mold is heated at a temperature between 20° C. and 100° C. before depositing the colored composition, the deposition of the colored composition is carried out with the aid of the inkjet printing assembly according to the loaded image.

10. The method according to claim 1, wherein the textile is selected from the group consisting of a natural textile, a synthetic textile, a textile coated with a thermoplastic resin, a luminous textile, and a textile coated with glue.

11. The method according to claim 1, wherein the textile is laminated on the heated thermoplastic resin, or is deposited with the aid of an applicator roll, or is deposited by pressing the textile on the mold.

12. The method according to claim 1, wherein the mold is a 2D mold previously etched by chemical etching, laser, machining, or wherein the mold is a 3D mold comprising steel, nickel, or silicone.

13. The method according to claim 1, wherein the method comprises a manufacturing of leather goods.

14. The method according to claim 1, wherein the varnish at step a0) comprises, by weight relative to the weight of the varnish composition:
   5 to 20% of at least one thermoplastic or thermosetting resin whose particles have a size between 0.1 and 10 µm,
   1 to 20% of at least one coloring agent,
   5 to 20% of at least one plasticizer, and
   45 to 75% of at least one organic solvent or water.

15. The method according to claim 1, wherein the colored composition comprises, by weight relative to the weight of the composition:
   5 to 20% of at least one thermoplastic or thermosetting resin whose particles have a size between 0.1 and 10 µm,
   1 to 20% of at least one coloring agent,
   5 to 20% of at least one plasticizer, and
   45 to 75% of at least one organic solvent or water.

16. The method according to claim 1, wherein the composition (A) comprises, by weight relative to the weight of the composition:
   from 40 to 50% by weight, of thermoplastic resin;
   from 25 to 40% by weight of plasticizer;
   from 5 to 10% by weight of solvent;
   from 0 to 5% by weight of pigment;
   from 0 to 3% by weight of additives;
   from 0 to 3% by weight of filler; and
   from 0 to 5% by weight of thermal stabilizer.

17. The method according to claim 1, wherein the composition (A) comprises, by weight relative to the weight of the composition:
   from 45 to 55% by weight of thermoplastic resin;
   from 35 to 45% by weight of plasticizer;
   from 0 to 3% by weight of pigment;
   from 0 to 3% by weight of additives;
   from 0 to 3% by weight of filler; and
   from 0 to 3% by weight of thermal stabilizer.

18. The method according to claim 1, wherein said bottom of the mold on which the varnish composition is deposited at step a0) comprises positive and/or negative etched patterns.

19. The method according to claim 18, wherein at step a1) the colored composition is deposited on the positive and/or negative etched patterns.

20. The method according to claim 1, wherein the composition (A) is applied at step b) to a thickness of between 20 and 150 µm, or 150 µm and 1.5 mm.

21. A method for manufacturing a textile composite part comprising a textile and a thermoplastic resin, the method comprising the following steps in this order:
   a) providing a mold having a bottom;
   a0) depositing a varnish composition at the bottom of the mold, heating the mold to produce a varnish layer as an external surface of the textile composite part;
   b) applying at least one composition (A) on the varnish layer, the at least one composition (A) comprising at least one thermoplastic resin, heating the mold, and obtaining a thermoplastic resin surface;
   b1) depositing a colored composition comprising at least one thermoplastic or thermosetting resin on all or a portion of the thermoplastic resin surface, providing colored pattern(s), heating the mold, and obtaining the thermoplastic resin surface having this/these colored pattern(s);
   c) applying at least one composition (A), comprising at least one thermoplastic resin, on the thermoplastic resin surface having the colored pattern(s) on top;
   d) heating the mold and the at least one composition (A);
   e) applying a textile to the heated at least one composition (A);
   f) cooling the mold; and
   g) removing the textile composite part from the mold, the textile composite part comprising an external surface that is made of the varnish layer through which the colored pattern(s) is/are visible.

* * * * *